(12) United States Patent
Lukens

(10) Patent No.: US 7,434,471 B2
(45) Date of Patent: Oct. 14, 2008

(54) PRESSURE MEASUREMENT TRANSDUCER WITH PROTECTIVE DEVICE

(75) Inventor: Peter C. Lukens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/654,201

(22) Filed: Jan. 16, 2007

(65) Prior Publication Data

US 2008/0168846 A1   Jul. 17, 2008

(51) Int. Cl.
*G01L 7/08* (2006.01)
(52) U.S. Cl. .............................. 73/715; 73/726; 73/720
(58) Field of Classification Search ................... 73/715, 73/706, 720, 726
See application file for complete search history.

(56) References Cited

U.S. PATENT DOCUMENTS

| | | | |
|---|---|---|---|
| 4,884,451 A | 12/1989 | Schulze | |
| 4,942,383 A | 7/1990 | Lam et al. | |
| 4,967,594 A | 11/1990 | Ehrenfried et al. | |
| 6,079,266 A | 6/2000 | Wright | |
| 6,183,076 B1 | 2/2001 | Childers et al. | |
| 6,672,170 B1 * | 1/2004 | DiPaola ........................ | 73/717 |
| 6,886,929 B2 | 5/2005 | Malik et al. | |
| 7,089,790 B2 | 8/2006 | Silverbrook et al. | |
| 2002/0020221 A1* | 2/2002 | Sittler et al. ................... | 73/715 |
| 2004/0007073 A1* | 1/2004 | Weise ........................... | 73/715 |
| 2004/0007074 A1* | 1/2004 | DiPaola et al. ................. | 73/715 |
| 2004/0007075 A1* | 1/2004 | Ishiguro et al. ................ | 73/715 |

* cited by examiner

*Primary Examiner*—Andre J Allen
(74) *Attorney, Agent, or Firm*—John J. Horn

(57) ABSTRACT

A pressure measurement device with protection from long-term loads and pressure shocks. The novel device includes a diaphragm adapted to deform in response to a pressure applied thereto, and a retractable support adapted to support the diaphragm during periods of non-operation. A strain gauge is attached to the diaphragm for measuring the deformation and the retractable support is designed to minimize stress on the strain gauge during periods of non-operation. The support is retracted during periods of operation to allow the diaphragm and strain gauge to function normally in response to the applied pressure. The diaphragm is disposed within a housing to form a first cavity, which is coupled to media to be measured, and a second cavity, which is set at a reference pressure. In an illustrative embodiment, the retractable support is a threaded plug inserted into the second cavity.

33 Claims, 3 Drawing Sheets

PRESSURE MEASUREMENT TRANSDUCER WITH PROTECTIVE DEVICE

The United States Government may have rights in this invention as provided under contract N00024-04-C-5456 awarded by the Department of the Navy.

BACKGROUND OF THE INVENTION

1. Field of the Invention

The present invention relates to pressure measurement devices. More specifically, the present invention relates to pressure transducers based on solid-state strain gauge devices.

2. Description of the Related Art

Pressure transducers are devices that convert pressure to an electrical signal, and are commonly used to measure fluid and gas pressures. For example, pressure transducers might be used to monitor ink levels in an inkjet printer or to measure the air pressure in a tire.

A conventional strain gauge based pressure transducer typically includes a cylindrical housing that is separated into two chambers by a thin, flexible diaphragm. The first chamber is coupled to the medium being measured, and the second chamber is set to a known reference pressure, such as atmospheric pressure. The diaphragm flexes slightly into one chamber or the other depending on the difference in pressure between the chambers. A strain gauge (a device whose resistance changes depending on the amount of strain placed on it) is attached to the diaphragm such that the flexure of the diaphragm introduces a strain on the gauge. The strain gauge then generates an electrical output signal that has a well-defined relationship to the pressure in the medium.

In certain applications, the pressure transducer may be left under load for a long time period before a measurement is needed. For example, a missile typically includes vessels charged with gas. After assembly, the missile may be held in storage for a long period of time (up to ten years) before being placed in operation. During this period, the gas may leak. If the required amount of gas is not present, the missile will fail to operate properly. It is therefore critical to accurately determine the amount of gas remaining in the missile just prior to operation, after a potentially long storage period (without disassembling the missile).

Conventional pressure transducers are not suitable for applications such as the one described above because solid-state strain gauge devices—such as a semiconductor Wheatstone bridge or piezoelectric wafer—are known to be susceptible to signal errors such as drift and hysterisis when left under load for extended periods of time. This drift is due to creep of the transducer substrate and transducer element materials. These transducers are also susceptible to damage from pressure shocks or "spikes" which can permanently deform or even rupture the electronic transducer element.

Hence, a need exists in the art for an improved system or method for measuring pressure that retains accuracy when subject to long term loads or pressure shocks.

SUMMARY OF THE INVENTION

The need in the art is addressed by the pressure measurement device of the present invention. The novel device includes a diaphragm adapted to deform in response to a pressure applied thereto and a retractable support adapted to support the diaphragm during periods of non-operation. A strain gauge is attached to the diaphragm for measuring the deformation and the retractable support is designed to minimize stress and deformation of the strain gauge during periods of non-operation. The support is retracted during periods of operation to allow the diaphragm and strain gauge to function normally in response to the applied pressure. The diaphragm is disposed within a housing to form a first cavity, which is coupled to media to be measured, and a second cavity, which is set at a reference pressure. In an illustrative embodiment, the retractable support is a threaded plug inserted into the second cavity until it comes into contact with the diaphragm or strain gauge.

BRIEF DESCRIPTION OF THE DRAWINGS

FIG. 2b is a close-up cross-sectional view of the retractable support of the alternate embodiment of FIG. 2a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
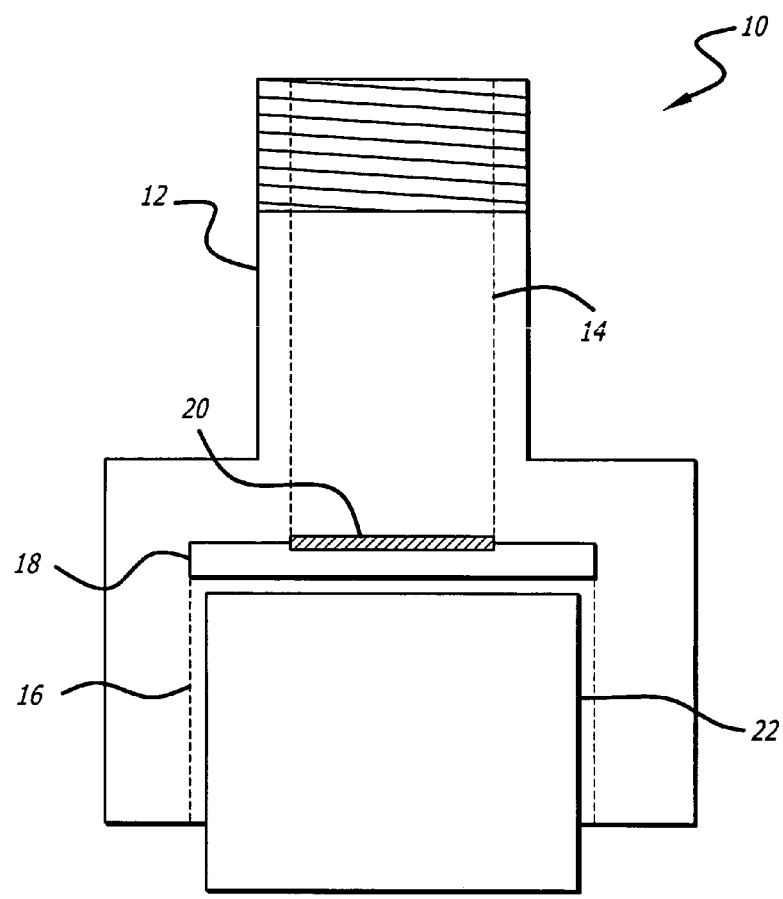
FIG. 1a is a simplified schematic of a pressure transducer designed in accordance with an illustrative embodiment of the present teachings.

FIG. 1a is a cross-sectional view of a pressure transducer 10 designed in accordance with an illustrative embodiment of the present teachings. The pressure transducer 10 includes a transducer body or housing 12 that forms an internal cavity 14 and an external cavity 16. The internal cavity 14 is coupled to the working media. The external cavity 16, which is not exposed to the working media, is set to a known reference pressure. The external cavity 16 may be open to the atmosphere (set to atmospheric pressure), or sealed and isolated from the atmosphere. In a preferred embodiment, the transducer body 12 is made from metal.

The internal cavity 14 and external cavity 16 are separated by a diaphragm 18 that flexes slightly into one cavity or the other depending on the difference in pressure between the cavities. A strain gauge 20 is attached to the diaphragm 18 such that the flexure of the diaphragm 18 introduces a strain on the gauge 20. The strain gauge 20 then generates an electrical output signal that has a defined relationship to the pressure in the working media. In a preferred embodiment, the strain gauge 20 is a solid-state strain gauge such as a semiconductor Wheatstone bridge or piezoelectric wafer.

In the illustrative embodiment of FIG. 1a, the strain gauge 20 is attached on the side of the internal cavity 14 and is therefore in direct contact with the working media. In operation, the working media in the internal cavity 14 loads the strain gauge 20, and deforms the strain gauge 20 and the diaphragm 18. This creates an electronic signal which can then be converted to a pressure reading by additional electronics (not shown in FIG. 1*a*).

In accordance with the teachings of the present invention, the pressure transducer 10 also includes a retractable diaphragm support 22 that protects the transducer 10 from long term loads and/or pressure shocks. The retractable support 22 is adapted to relieve stress on the electronic transducer element 20 during periods when measurements are not being acquired. The support 22 is then retracted during periods of use to allow the transducer 10 to function in a normal manner.

Figure 1B:
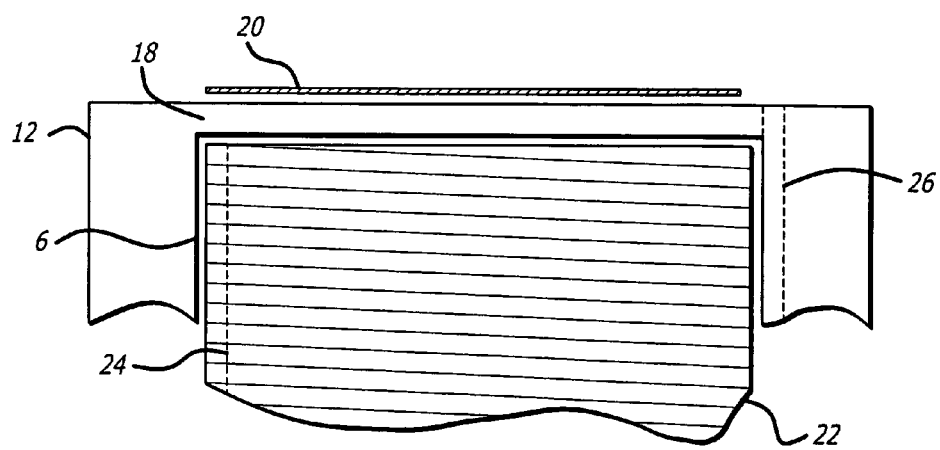
FIG. 1b is a cross-sectional view of an illustrative embodiment of a retractable support for a pressure transducer designed in accordance with the present teachings.

FIG. 1*b* is a cross-sectional view of an illustrative embodiment of a retractable support 22 for a pressure transducer 10 designed in accordance with the present teachings. In this embodiment, the retractable support 22 is in the form of a threaded metal plug. The plug 22 is inserted into the external cavity 16 by means of a thread on the exterior of the plug 22 and a mating thread on the interior of the external cavity 16. During periods of non-operation (i.e., when measurements are not needed), the plug 22 is inserted into the external cavity 16, by screwing it into the transducer housing 12 until it comes into contact with the diaphragm 18, relieving the load on the transducer element 20 and diaphragm 18. During periods of operation (acquiring measurements), the support 22 is retracted (by unscrewing the plug 22) to allow the transducer 10 to function properly.

The retractable diaphragm support 22 and/or the housing 12 may have Vernier scale markings to allow it to be inserted to a precise location and retracted to a precise location. Alternatively, the placement of the support 22 can be determined by monitoring the output signal of the strain gauge 20. For example, the support 22 may be inserted until there is a null in the strain gauge output signal. At this point, when the strain gauge 20 is no longer giving any signal, the gauge 20 is fully supported.

The retractable diaphragm support 22 may also have a gas relief channel 24 cut into it as a means to maintain neutral gas pressure on the external side of the diaphragm 18 when the support 22 is inserted or retracted. Thus, when the support 22 is inserted, any ambient gas in the external cavity 16 will not be trapped between the support 22 and the diaphragm 18, but flows out through the gas relief channel 124. When the support 22 is retracted, gas flows back into the external cavity 16 through the gas relief channel 124.

As shown in FIG. 1*b*, a wiring channel 26 may be cut into the transducer housing 12 and/or the diaphragm 18 to provide a means for making electrical connections with the strain gauge 20. Wires can then be placed through the channel 26 to couple the strain gauge 20 to additional electronics such as an output amplifier and/or a bias voltage source (not shown).

Figure 2A:
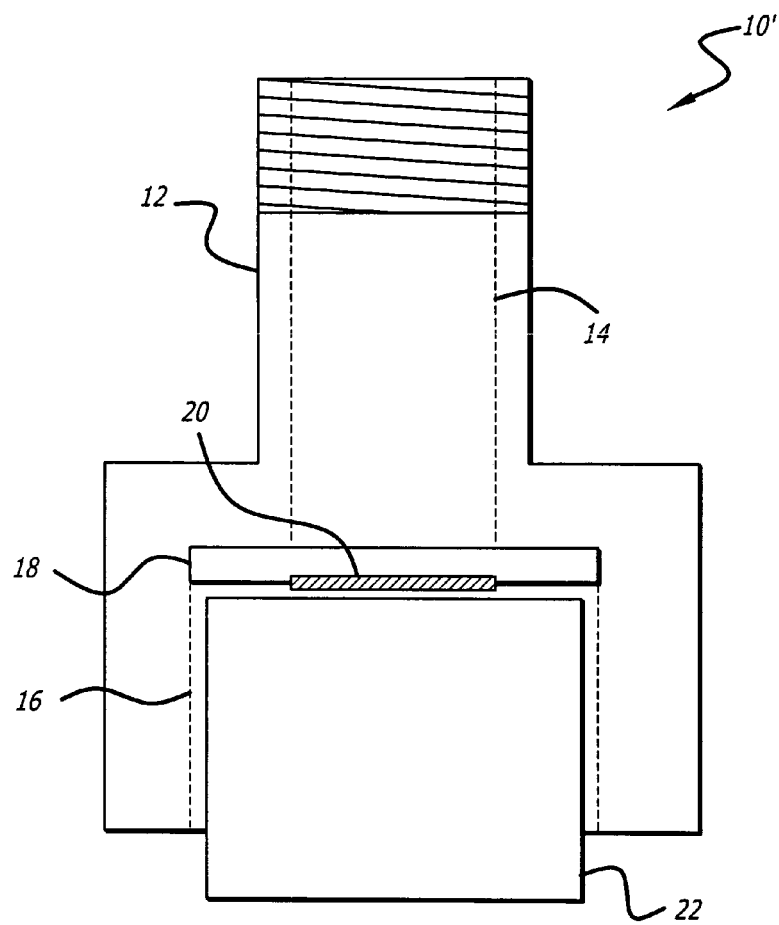
FIG. 2a is a cross-sectional view of an alternate illustrative embodiment of a pressure transducer designed in accordance with the present teachings.
Figure 2B:
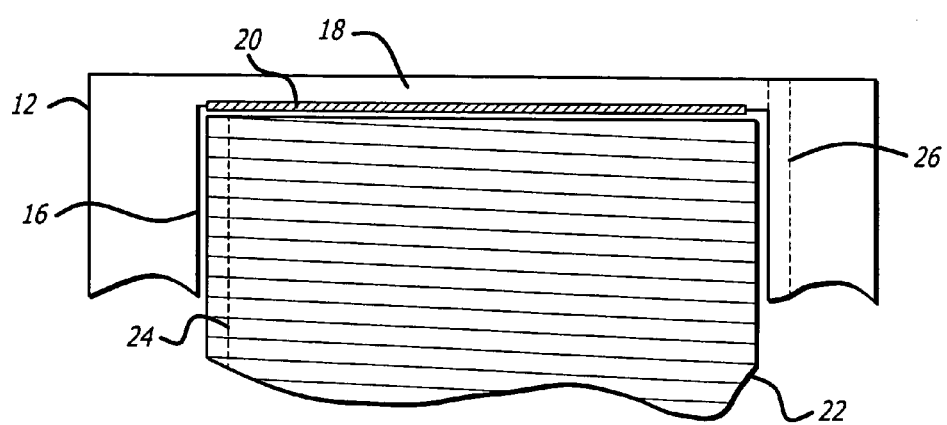

FIG. 2*a* is a cross-sectional view of an alternate illustrative embodiment of a pressure transducer 10' designed in accordance with the present teachings. FIG. 2*b* is a close-up cross-sectional view of the retractable support 22 of the alternate embodiment of FIG. 2*a*. The pressure transducer 10' shown in FIGS. 2*a* and 2*b* is identical to that of FIGS. 1*a* and 1*b*, except that the strain gauge 20 is attached to the diaphragm 18 on the side of the external cavity 16 (instead of on the side of the internal cavity 14 as in the embodiment of FIGS. 1*a* and 1*b*). This placement serves to protect the strain gauge 20 from exposure to the working media and eliminates the need for hermetically sealed electrical connections through the diaphragm 18.

As in the first embodiment, the pressure transducer 10' includes a retractable support 22 to protect the strain gauge 20 from long-term loads and shocks. During periods of non-operation, the support 22 is inserted into the external cavity 16 until it comes into contact with the strain gauge 20. During periods of operation, the support 22 is retracted. The working media in the internal cavity 14 loads the diaphragm 18 and deforms it and the strain gauge 20 affixed to it. This creates an electronic signal, which can then be converted to a pressure reading.

As shown in FIG. 2*b*, a wiring channel 26 may be cut into the transducer housing 12 to provide a means for making electrical connections with the strain gage 20. In this embodiment, the wiring channel 26 does not need to pass through the diaphragm 18 to provide access to the strain gauge 20.

A threaded metal plug as described above is a simple implementation of the retractable support concept of the present invention. Other implementations may also be used without departing from the present teachings. For example, the pressure transducer may include an automated retractable support such as a solenoid, electric motor or piezoelectric wafer.

Figure 3:
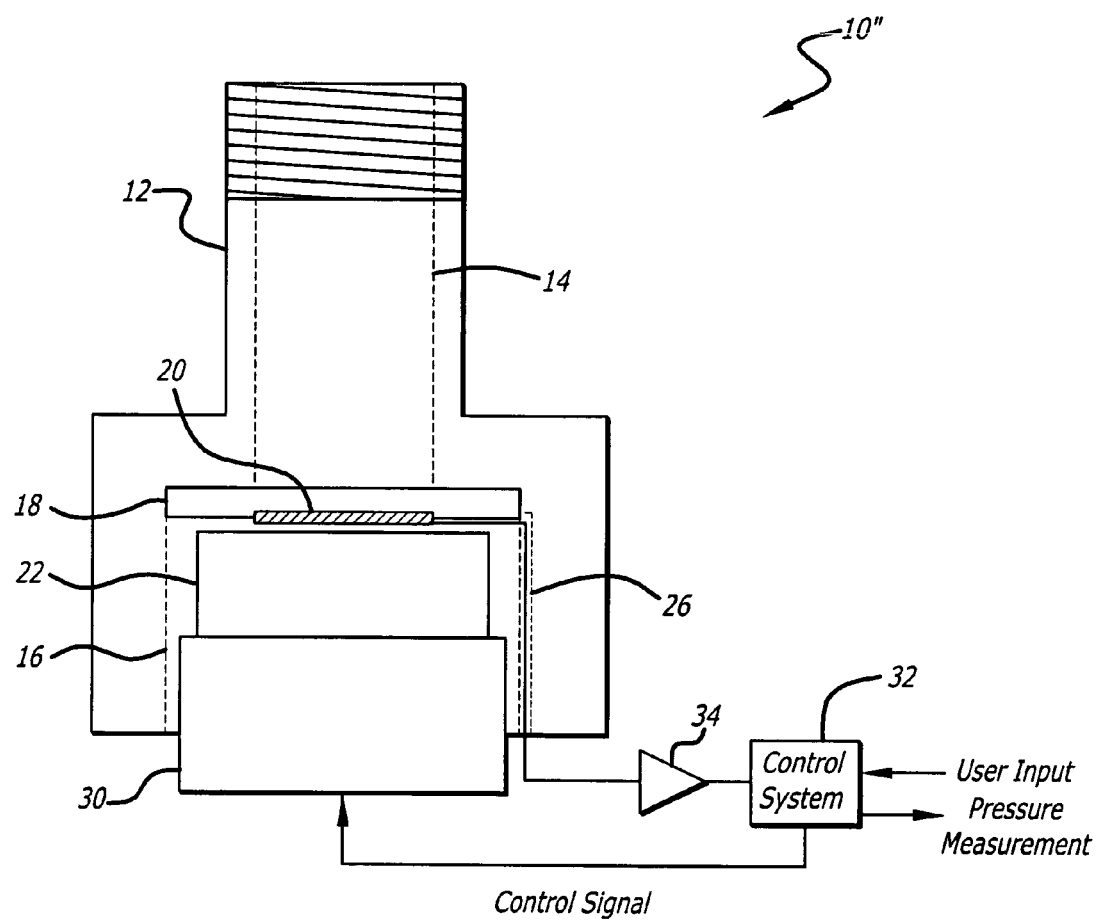
FIG. 3 is a simplified diagram of a pressure transducer with an automated retractable support designed in accordance with an illustrative embodiment of the present teachings.

FIG. 3 is a simplified diagram of a pressure transducer 10" with an automated retractable support 22 designed in accordance with an illustrative embodiment of the present teachings. In this embodiment, the retractable support 22 is a metal plug coupled to a mechanism 30 for moving the plug 22 towards or away from the diaphragm 18 and strain gauge 20 in response to an electronic control signal. The retracting mechanism 30 may be implemented using, for example, a solenoid or an electric motor. A control system 32 generates the control signal for the retracting mechanism 30. When the pressure transducer 10" is to begin acquiring measurements, the control system generates a control signal instructing the mechanism 30 to move the support 22 away from the diaphragm 18 by some predetermined amount (such that the transducer 10" can operate properly). When the pressure transducer 10" is finished acquiring measurements, the control system generates a control signal instructing the mechanism 30 to move the support 22 towards the diaphragm 18 by some predetermined amount (such that the diaphragm 18 and strain gauge 20 are fully supported by the plug 22). Depending on the application, the periods of operation and non-operation may be programmed into the control system 32, or they may be input by the user (or by another system).

Optionally, the pressure transducer 10" may use the output from the strain gauge 20 to control the precise placement of the retractable support 22. As shown in FIG. 3, the output of the strain gauge 20 is passed through an amplifier 34 and input to the control system 32. The control system 32 converts the strain gauge measurement to a pressure measurement, which is output to the user. The strain gauge measurement is also used to generate the control signal. Instead of moving the support 22 towards the diaphragm 18 by some predetermined amount, the control system 32 is adapted to instruct the mechanism 30 to stop moving the support 22 when the strain gauge measurement is at a predetermined level such as, for example, when the strain gauge output is at a null (at this point the strain gauge 20 is flat, minimizing the strain on the strain gauge 20).

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,
What is claimed is:

1. A device for measuring pressure comprising:
a diaphragm adapted to deform in response to a pressure applied thereto during periods of operation and
first means for minimizing deformation in said diaphragm during periods of non-operation.

2. The invention of claim 1 wherein said first means includes a retractable support adapted to support said diaphragm such that deformation is minimized during periods of non-operation and to retract to allow deformation in said diaphragm during periods of operation.

3. The invention of claim 1 wherein said device further includes second means for measuring said deformation in said diaphragm.

4. The invention of claim 3 wherein said second means includes a strain gauge attached to said diaphragm such that a deformation of said diaphragm introduces a stain in said gauge.

5. The invention of claim 4 wherein said first means is adapted to support said diaphragm such that strain on said strain gauge is minimized.

6. The invention of claim 5 wherein said device further includes a housing.

7. The invention of claim 6 wherein said diaphragm is disposed within said housing such that an interior of said housing is separated into first and second cavities.

8. The invention of claim 7 wherein said first cavity is coupled to media to be measured.

9. The invention of claim 8 wherein said second cavity is set to a reference pressure.

10. The invention of claim 9 wherein said first means includes a retractable support inserted into said second cavity.

11. The invention of claim 10 wherein said first means further includes means for moving said retractable support to support said diaphragm during periods of non-operation and retracting said support from said diaphragm during periods of operation.

12. The invention of claim 11 wherein said first means further includes third means for determining a placement of said support.

13. The invention of claim 12 wherein said third means is adapted to determine the placement of said support depending on an output signal from said strain gauge.

14. The invention of claim 13 wherein said support is inserted into said second cavity until there is a null is said output signal.

15. The invention of claim 10 wherein said device further includes means for fluid to flow in and out of said second cavity to maintain neutral pressure when said support is inserted or retracted.

16. A pressure transducer comprising:
a housing;
a diaphragm disposed within said housing to form a first cavity and a second cavity, said diaphragm adapted to deform in response to a pressure difference between said first and second cavities;
a strain gauge attached to said diaphragm such that a deformation of said diaphragm introduces a strain in said gauge, said strain gauge generating an electrical output signal in response to said strain; and
a retractable support disposed within said second cavity and adapted to support said strain gauge during periods of non-operation and retract from said strain gauge during periods of operation.

17. The invention of claim 16 wherein said retractable support is adapted to support said strain gauge such that strain on said strain gauge is minimized.

18. The invention of claim 16 wherein said first cavity is coupled to media to be measured.

19. The invention of claim 18 wherein said second cavity is set to a reference pressure.

20. The invention of claim 16 wherein said strain gauge is a solid-state strain gauge.

21. The invention of claim 16 wherein said retractable support is a threaded plug.

22. The invention of claim 21 wherein said housing includes a mating thread for said threaded plug in said second cavity.

23. The invention of claim 16 wherein said retractable support includes a gas relief channel for maintaining neutral gas pressure when said support is inserted in or retracted from said second cavity.

24. The invention of claim 16 wherein said housing includes a wiring channel for making electrical connections with said strain gauge.

25. The invention of claim 16 wherein said pressure transducer further includes a mechanism for moving said retractable support in response to a control signal.

26. The invention of claim 25 wherein said pressure transducer further includes a control system for generating said control signal.

27. The invention of claim 26 wherein said control system is adapted to generate a control signal instructing said mechanism to move said support away from said strain gauge by some predetermined amount when said transducer is to begin acquiring measurements.

28. The invention of claim 27 wherein said control system is adapted to generate a control signal instructing said mechanism to move said support towards said strain gauge by some predetermined amount when said transducer is finished acquiring measurements.

29. The invention of claim 26 wherein said control system is adapted to receive said output signal and in accordance therewith generate said control signal.

30. The invention of claim 29 wherein said control signal is adapted to instruct said mechanism to move said support towards said strain gauge until there is a null is said output signal.

31. The invention of claim 16 wherein said housing and/or retractable support include Vernier scale markings to indicate a location to which said support should be inserted.

32. The invention of claim 16 wherein said housing and/or retractable support include Vernier scale markings to indicate a location to which said support should be retracted.

33. A method for protecting a pressure transducer from long term loads and pressure shocks including the steps of:
applying a pressure to be measured to said transducer such that a diaphragm in said transducer deforms in response to said pressure;
providing a strain gauge attached to said diaphragm to measure a deformation in said diaphragm;
supporting said diaphragm and strain gauge using a retractable support to minimize stress on said strain gauge during periods of non-operation; and
retracting said support to allow said diaphragm to deform and said strain gauge to obtain deformation measurements during periods of operation.

* * * * *